United States Patent [19]
Boreman et al.

[11] Patent Number: 6,037,590
[45] Date of Patent: Mar. 14, 2000

[54] POLARIZATION-TUNABLE ANTENNA-COUPLED INFRARED DETECTOR

[75] Inventors: Glenn D. Boreman, Geneva; Aristide Dogariu, Oviedo; Christos Christodoulou, Orlando, all of Fla.

[73] Assignee: University of Central Florida, Orlando, Fla.

[21] Appl. No.: 09/004,132

[22] Filed: Jan. 7, 1998

Related U.S. Application Data

[60] Provisional application No. 60/048,334, May 30, 1997.

[51] Int. Cl.$^7$ .................................. G01J 5/20; G01J 5/34
[52] U.S. Cl. ..................................... 250/338.4; 250/338.1; 250/341.3
[58] Field of Search ............................. 250/338.1, 338.4, 250/339.02, 339.05, 341.3; 343/893, 700 MS

[56] References Cited

U.S. PATENT DOCUMENTS

| | | |
|---|---|---|
| Re. 30,131 | 10/1979 | Javan . |
| 4,652,885 | 3/1987 | Saffold et al. . |
| 5,239,179 | 8/1993 | Baker . |
| 5,248,884 | 9/1993 | Brewitt-Taylor et al. ........... 250/338.4 |
| 5,404,146 | 4/1995 | Rutledge . |
| 5,432,374 | 7/1995 | Norton ................................. 257/442 |
| 5,436,453 | 7/1995 | Chang et al. . |
| 5,442,176 | 8/1995 | Eckel, Jr. et al. . |
| 5,446,284 | 8/1995 | Butler et al. . |
| 5,512,750 | 4/1996 | Yanka et al. . |
| 5,519,529 | 5/1996 | Ahearn et al. . |
| 5,523,570 | 6/1996 | Hairston . |
| 5,773,831 | 6/1998 | Brouns ............................. 250/370.08 |

FOREIGN PATENT DOCUMENTS 2260218   7/1993   United Kingdom .

OTHER PUBLICATIONS

M. Leung, M. Wire, L. Heflinger, T. Pham, L. Eaton, and D. Rutledge. Improved Performance of a Superconductive Optical Detector with Planar Antennas. IEEE Transactions on Applied Soperconductivity, vol. 3, pp. 2163–2166, Mar. 1993.

P. M. Haskins, J. S. Dahele, I. L. Morrow, and P.S. Hall. Active Polarization–Agile Microstrip Patch Antennas. Antennas and Propagation. Ninth International Conference, Apr. 4–7, 1995, (Conference Publication No. 407). 1995. vol. 1, pp. 163–165, May 1995.

Lenrod Goldstone. Polarization Diversity Lens. Antennas and Propagation Society International Symposium, AP–S. Digest, 1994 vol. 1, pp. 470–473, Mar. 1994.

Micheal A. Forman and Zoya B. Popovic. A Tunable Second–Resonance Cross–Slot Antenna. Antenna and Propagation Symposium, 1997. IEEE., 1997 Digest, vol. 1, pp. 18–21, Mar. 1997.

Opliger, Nanometer Thin–Film Ni–NiO–Ni Diodes for 30 Thz Radiation, *Applied Physics*, 1994 pp. 329–341.

*Primary Examiner*—Constantine Hannaher
*Assistant Examiner*—Albert Gagliardi
*Attorney, Agent, or Firm*—Brian S. Steinberger; Law Offices of Brian S. Steinberger

[57] ABSTRACT

An antenna-coupled infrared detector with polarization tuning over approximately 90 degrees by application of a bias voltage in the range of a few hundred millivolts. This mechanism of polarization tuning eliminates the need for bulk-optical polarization filters. When integrated into focal plane arrays, these detectors can be used in remote-sensing systems to facilitate enhanced image recognition, feature extraction and image-clutter removal. A preferred version of the antenna has longitudinal metal antenna arms extending outward from an infrared(IR) sensor in a spiral pattern, polarization tuning devices connected between the antenna arms, and a voltage for controlling the polarization tuning devices, wherein the polarization tuning devices enable real-time control of current distribution in the arms. The infrared(IR) sensors can be tunnel diodes, schottky diodes, photovoltaics, photoconductors, and pyroelectrics. Application areas can include earth-resource mapping, pollution monitoring, and general surveillance.

19 Claims, 8 Drawing Sheets

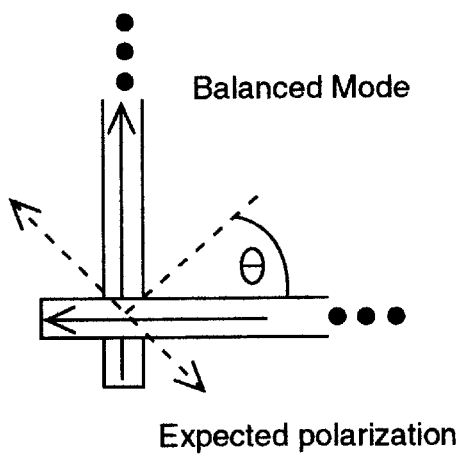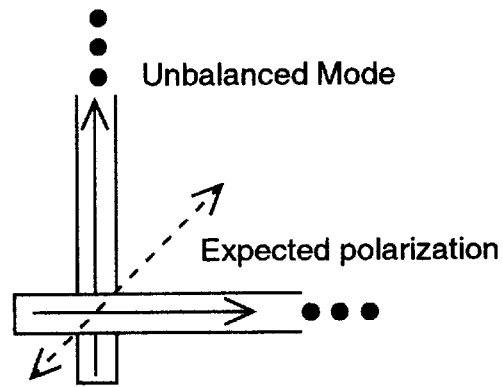
Fig. 2A
Fig. 2B

POLARIZATION-TUNABLE ANTENNA-COUPLED INFRARED DETECTOR

This invention claims priority of U.S. Provisional Application No. 60/048,334 entitled: Tunable Antenna-Coupled Infrared Detector, filed on May 30, 1997.

This invention relates to infrared detectors, and in particular to an antenna, which includes a diode at the antenna feed whose capacitance is controlled by an externally applied voltage. This allows polarization tuning of the collected infrared radiation onto an infrared detector sensor.

BACKGROUND AND PRIOR ART

Infrared(IR) systems have been widely used in the past. Current systems generally require bulk optical systems having multiple moving parts for polarization control. Image forming radiation is typically collected for a fixed polarization state. Optical filters must be used in the optical train before the receiving detector array. The selection of the polarization state requires mechanical motion of the optical filters. The typical weight of the necessary filter and switching assemblies is on the order of 1 kg or more. The required time to switch between polarization states can be on the order of 2 seconds or more. Polarization-resolved imagery is largely unexploited, because of inconvenient implementation.

Many U.S. Patents have been proposed for Infrared detectors but have many of the problems previously described. See for example U.S. Pat. Nos.: Re.30,131 to Javan; 4,652,885 to Saffold et al.; 5,239,179 to Baker; 5,248,884 to Brewitt-Taylor et al.; 5,404,146 to Rutledge; 5,432,374 to Norton; 5,436,453 to Chang et al.; 5,442,176 to Eckel, Jr. et al.; 5,446,284 to Butler et al.; 5,512,750 to Yanka et al.; 5,519,529 to Ahearn et al.; and 5,523,570 to Hairston.

SUMMARY OF THE INVENTION

The first objective of the present invention is to provide an Infrared(IR) detector antenna system for collecting image-forming radiation over a variable polarization state.

The second object of this invention is to provide an IR detector antenna system of collecting radiation in dynamically programmable polarization states.

The third object of this invention is to provide an IR detector antenna system where optical filters are eliminated and polarization selection is integrated directly onto the detector array.

The fourth object of this invention is to provide an IR detector antenna system where the control and selection of the polarization state is completely electronic and requires no moving parts.

The fifth object of this invention is to provide an IR detector antenna system where the weight required for implementation is essentially zero.

The sixth object of this invention is to provide an IR detector antenna system where the time required to switch polarization is compatible with video frame rates on the order of approximately $3/1000$ of a second.

The seventh object of this invention is to provide an IR detector antenna system where the polarization state for reception can be tailored to features of interest in the image data.

The eighth object of this invention is to provide an IR detector antenna system which enables the development of improved algorithms for both image-recognition and for discrimination against image clutter.

In the subject invention, infrared antennas are integrated into existing Infrared(IR) focal-plane-array (FPA) systems. The arrangement is an array of independent antenna-coupled detectors, rather than a phased-array antenna. Each novel detector pixel square can have exterior dimensions of between approximately 40 um to approximately 50 um on each side. The size of the array can be approximately 5 to approximately 20 mm across each side. One possible embodiment of an individual pixel (unit cell) includes a series connection of individual antenna-coupled infrared sensors distributed over the unit cell.

The polarization tuning is accomplished by the fact that the relative phase of the current waves on the arms of each antenna is determined by the capacitance of the load impedance located at the feed.

The capacitance of the IR sensing diode used at the feed is a function of the externally applied voltage across the arms of the antenna.

The polarization response of the sensor can thus be controlled electronically, eliminating the need for separate optical filters.

These detectors and their arrays can be used in remote-sensing systems to facilitate enhanced image recognition, feature extraction, and image-clutter removal. The application areas can include earth-resource mapping, pollution monitoring and general surveillance.

Further objects and advantages of this invention will be apparent from the following detailed description of a presently preferred embodiment which is illustrated schematically in the accompanying drawings.

BRIEF DESCRIPTION OF THE FIGURES

FIG. 2A shows the foundation of the polarization switching behavior for a balanced mode in the Antenna-coupled sensor of FIGS. 1A–1B.

FIG. 2B shows the foundation of the polarization switching behavior of the subject invention for an unbalanced mode in the antenna-coupled sensor of FIGS. 1A–1B.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1A:
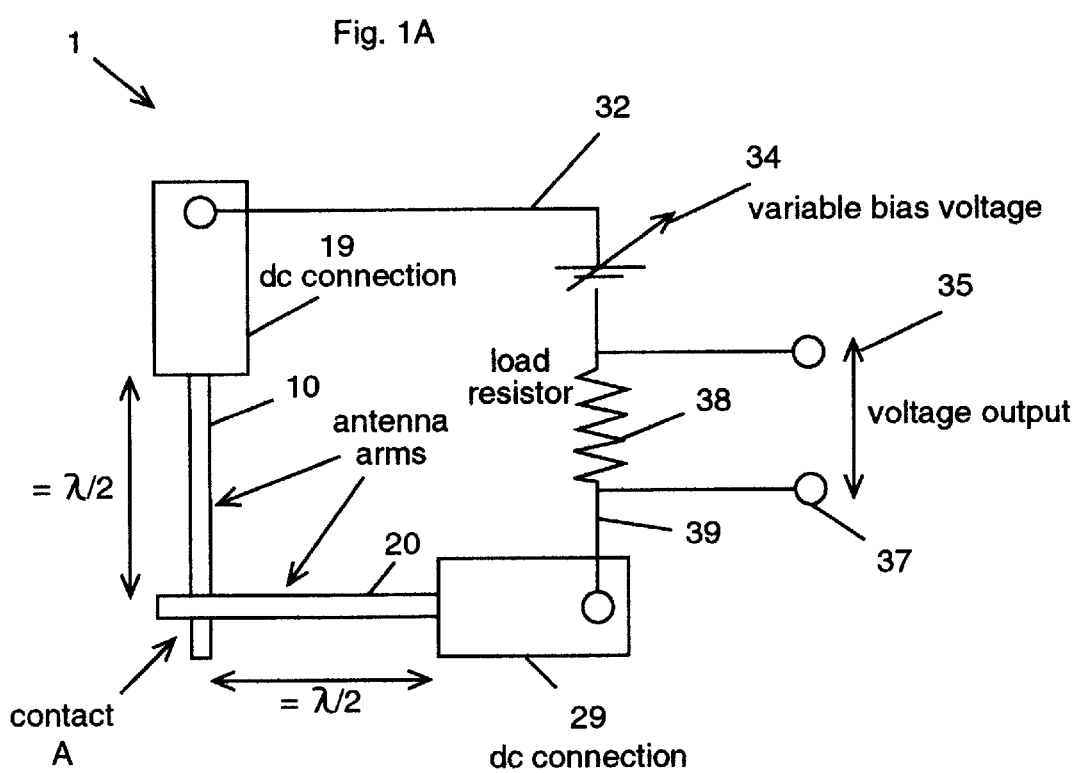
FIG. 1A is a top view of a single antenna-coupled sensor. It is one sub-unit of the pixel. Pixels (FIG. 3) are arranged into focal-plane arrays (FIG. 4).
Figure 1B:
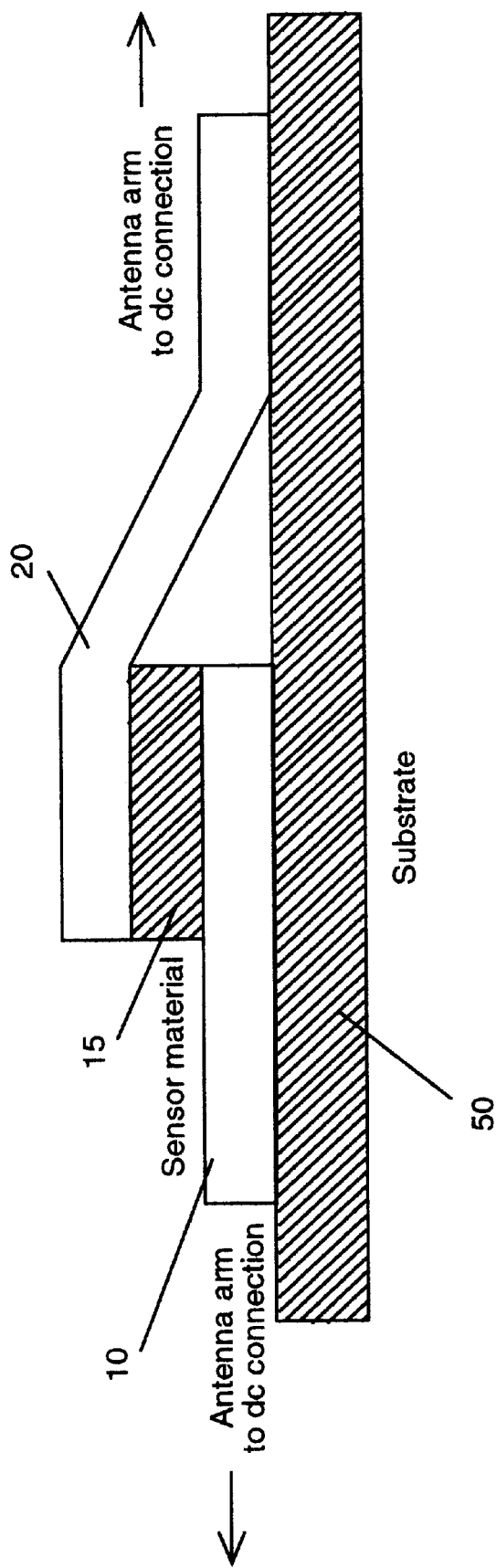
FIG. 1B is an enlarged side view of the contact region between the first and second antenna arms of FIG. 1A, along arrow A.

FIG. 1A is a top view of a single antenna-coupled sensor 1. It is one sub-unit of the pixel. Pixels (FIG. 3) are arranged into focal-plane arrays (FIG. 4). FIG. 1B is an enlarged side view of the contact region between the first and second antenna arms of FIG. 1A, along arrow A. Referring to FIGS. 1A–1B, the individual wires 10, 20 of the antenna 1 are made of metal (such as but not limited to aluminum, gold, nickel, etc.). The wires 10, 20 have a length approximately equal to one half of the wavelength of the radiation incident on the antenna 1.

Referring to FIGS. 1A–1B, antenna 1 is lithographically fabricated on top of a transparent substrate material 50 such as silicon. Antenna 1 is generally illuminated through the dielectric substrate 50, then the relevant wavelength (as far as the length of the arms is concerned) is the wavelength of the radiation inside the substrate 50. This is the free-space wavelength of 10 microns (infrared) and for example, in a silicon substrate the substrate wavelength is around 3 microns.

Referring to FIGS. 1A–1B, the incident electromagnetic radiation will induce infrared-frequency (on the order of 30 THz) current waves to flow in the arms 10, 20 of the antenna 1, along the direction of the incident electric field (the electric field of incident radiation has an arbitrary in-plane orientation.). The induced current waves will propagate along the antenna wires 10, 20, producing an infrared-frequency voltage across the sensor material. This is the mechanism for capturing the incident radiation. Sensor material 15 can include but is not limited to tunnel diodes such as NiO and AlO. Sensor material 15 can further include Schottky diodes such as but not limited to PtSi, NiSi, and IrSi. Sensor material 15 can further include photovoltaic materials such as but not limited to Si, LnSb, and HgCdTe. Sensor material 15 can further include photoconductive materials such as but not limited to PbSe, PbS, Si, InSb, and HgCdTe. Sensor material 15 can further include pyroelectric materials such as but not limited to $LiTaO_3$. Antenna arms 10 and 20 can be metal wires with a small in-plane width compared to the wavelength of the incident radiation(See FIG. 5, i.e. approximately 2 um).

Referring to FIGS. 1A–1B, the infrared sensor material 15 constitutes a load impedance of nominally 100 ohms across the contact region of the antenna 1, seen in the side view of FIG. 1B. For diode sensors 15 (FIG. 1B), the current waves are rectified by the nonlinear current-voltage characteristic causing a change in the dc resistance. This dc resistance is read out by means of a voltage output 35, 37 having a value of approximately +/−100 millivolts across a load resistor 38 of approximately 100 ohms between the dc connection 29 and variable bias voltage 34 of +/−200 millivolts in antenna 1. Lines 32 and 39 connect antennas 19, 29 to the bridge circuit. Other types of infrared sensor materials can also be used in the configuration of FIGS. 1A–1B. For example, bolometric sensors will dissipate the current waves, causing a temperature rise in the bolometer, and a change in the dc resistance.

The polarization-tuning mechanism arises because the impedance presented to the antenna 1 is not a pure resistance. Particularly in the case of diode sensors, the impedance has an inherent capacitive component caused by the semiconductor junctions inherent in the construction of the diode. These junctions have a capacitance that is a function of the applied voltage. This voltage is supplied across the dc connections 19, 29 of the antenna 1.

The ability to change the capacitance of the sensor by changing the externally applied bias voltage is the key to tuning the polarization of the antenna-coupled sensor. Referring to FIGS. 1A–1B, antenna arms 10 and 20 constitute a transmission line. In any such structure, the load impedance will determine the phase relationship between the current waves that can be excited on the line.

FIG. 2A shows the foundation of the polarization switching behavior for a balanced mode. FIG. 2B shows the foundation of the polarization switching behavior of the subject invention for an unbalanced mode. These two modes have a different polarization signature, shown as the dotted line. The mixing between these two modes and the resulting net polarization state of the IR sensor is determined by capacitance of the contact A, which is dependent on the bias voltage applied across the dc contacts 19, 29. FIGS. 2A–2B, considers only the two primary current-wave modes that propagate on the antenna arms 10, 20. When the current waves are 180 degrees out of phase at the contact A, this is called a balanced mode. The situation when the current waves are in-phase at the contact is called an unbalanced mode. These two modes of FIGS. 2A, 2B have a polarization response that is 90 degrees apart. Any phase between the current waves that is not zero or 180 degrees can be expressed as a sum of these two modes. The polarization response for these intermediate conditions can be similarly expressed as a sum of the two polarization states. The angle of the polarization response, seen as the vector sum of the directions of the two current waves, will depend on the mixture of the two modes. It has been demonstrated previously in published research by one of the subject inventors that the polarization response of an infrared antenna 1 depends on this phase relationship. See "Polarization response of asymmetric-spiral infrared antennas," Applied Optics, Vol. 36, pp 6485–6490 (Sep. 1, 1997). The phase difference is determined by the capacitance of the contact impedance, which can be controlled by the external bias voltage. Thus the external bias voltage controls the mode mixture and hence the polarization response of the sensor.

Figure 3:
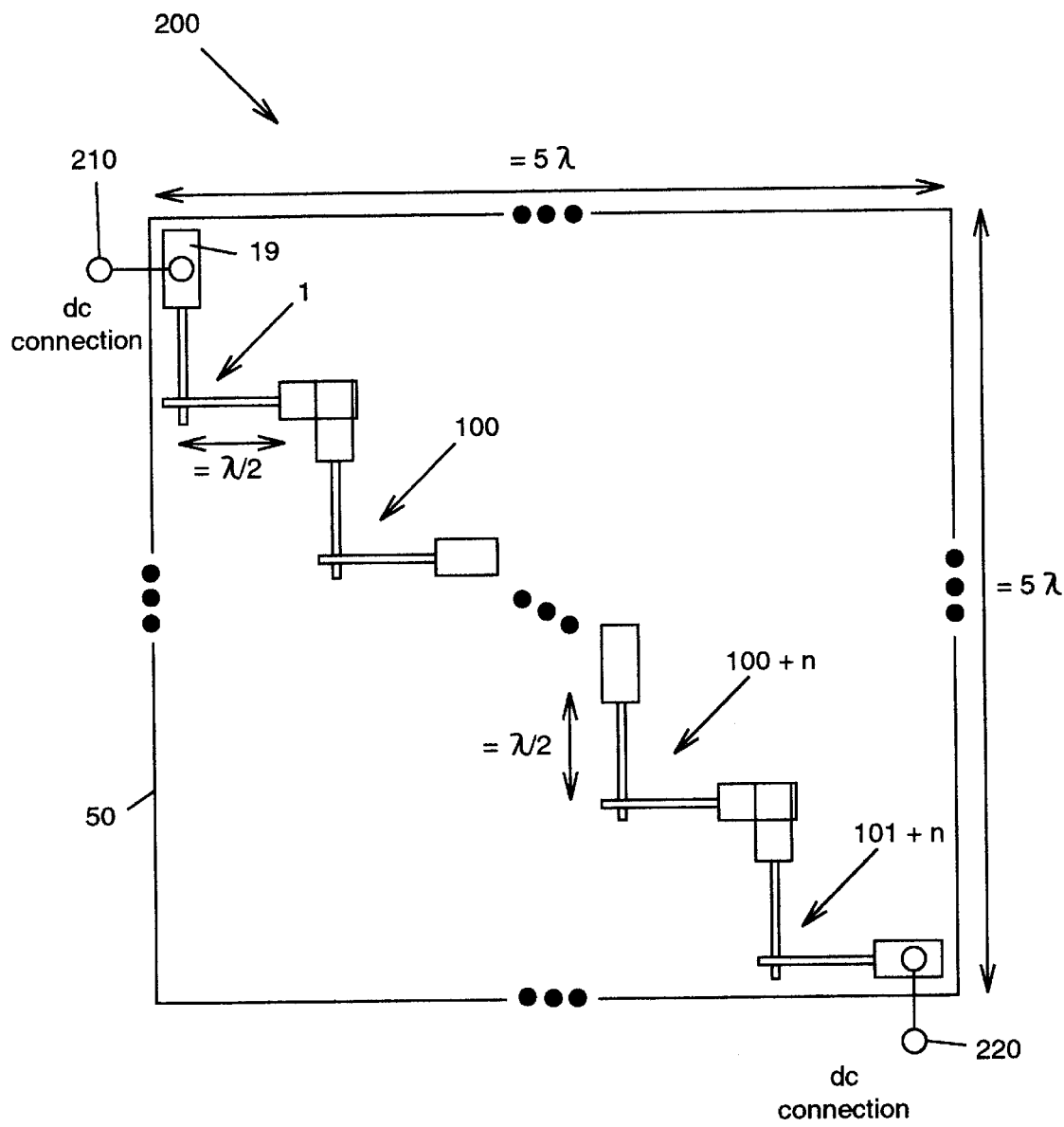
FIG. 3 is a single pixel of the focal plane array shown in FIG. 4 and is composed of a series connection of individual antenna-coupled sensors shown in FIG. 1.
Figure 4:
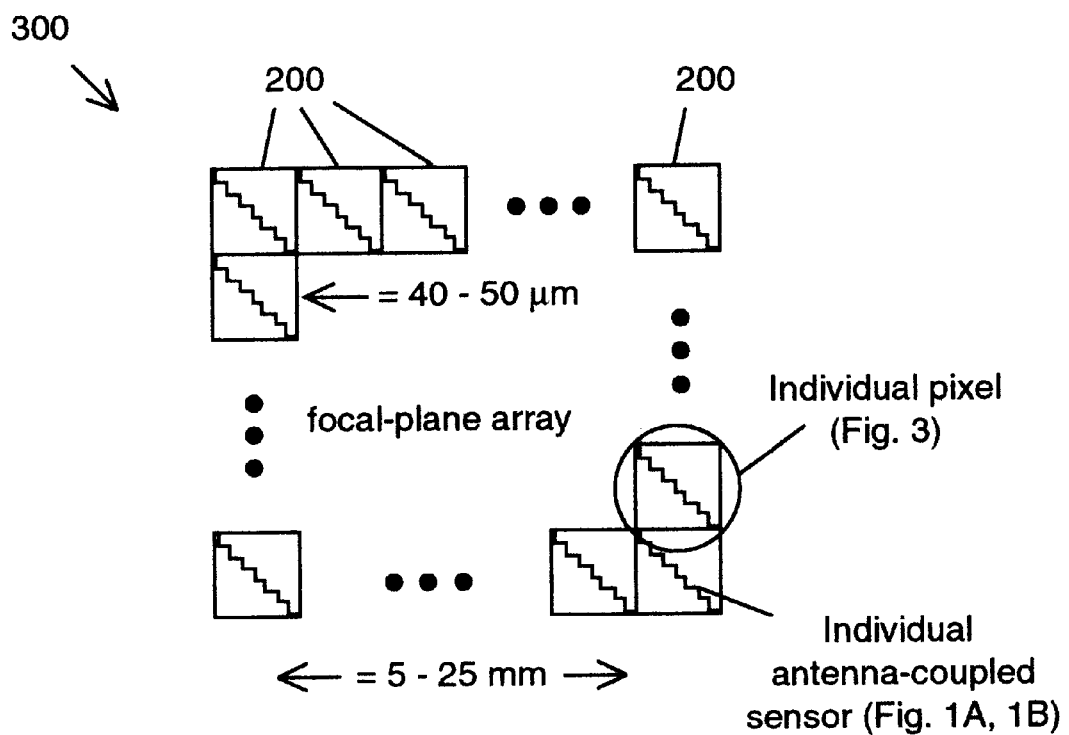
FIG. 4 is a focal plane array, composed of a matrix of individual pixels, each consisting of a series connection of antenna coupled sensors.

FIG. 3 is a single pixel (cell) 200 of the focal plane array shown in FIG. 4 and is composed of a series connection of individual antenna-coupled sensors 1 shown in FIG. 1 and other individual antenna-coupled sensors 100 to (100+n), and (101+n). These individual sensors are electrically connected in series to constitute one pixel 200. Such a series connection will allow an external bias voltage to be applied at nodes 210, 220 across all sensor elements 1, 100 to (100+n), and (101+n) simultaneously, controlling the polarization response of all sensors elements. Because the sensors are subwavelength in dimension, the series connection will also provide an enhanced collection efficiency, compared to one sensor 1 alone. The signals from each sensor 1, 100 to (100+n), and (101+n) in the pixel 200 will also add in this configuration, providing an increased signal level (proportional to the number of elements in series) compared to a single sensor 1. Component 50 refers to the substrate such as but not limited to silicon and the like, similar to substrate 50 shown in FIG. 1A. The pixel 200 is read out as a unit, providing a measurement of the radiation that falls on the pixels as a whole. A pixel 200 will typically be a square of dimension 40 to 50 microns on one side (approximately 5 wavelengths of the incident radiation).

These pixels (cells) will be arranged in a focal plane array 300, seen in FIG. 4. The focal plane array 300 can be placed in the image plane of an optical system. The arrangement and readout of individual pixels are capable of forming resolved images of the radiation that falls on the array. A focal plane array 300 can contain a matrix of between approximately 128 to approximately 512 pixels on a side, yielding focal plane array dimensions of approximately 5 to approximately 25 millimeters on a side.

Figure 5:
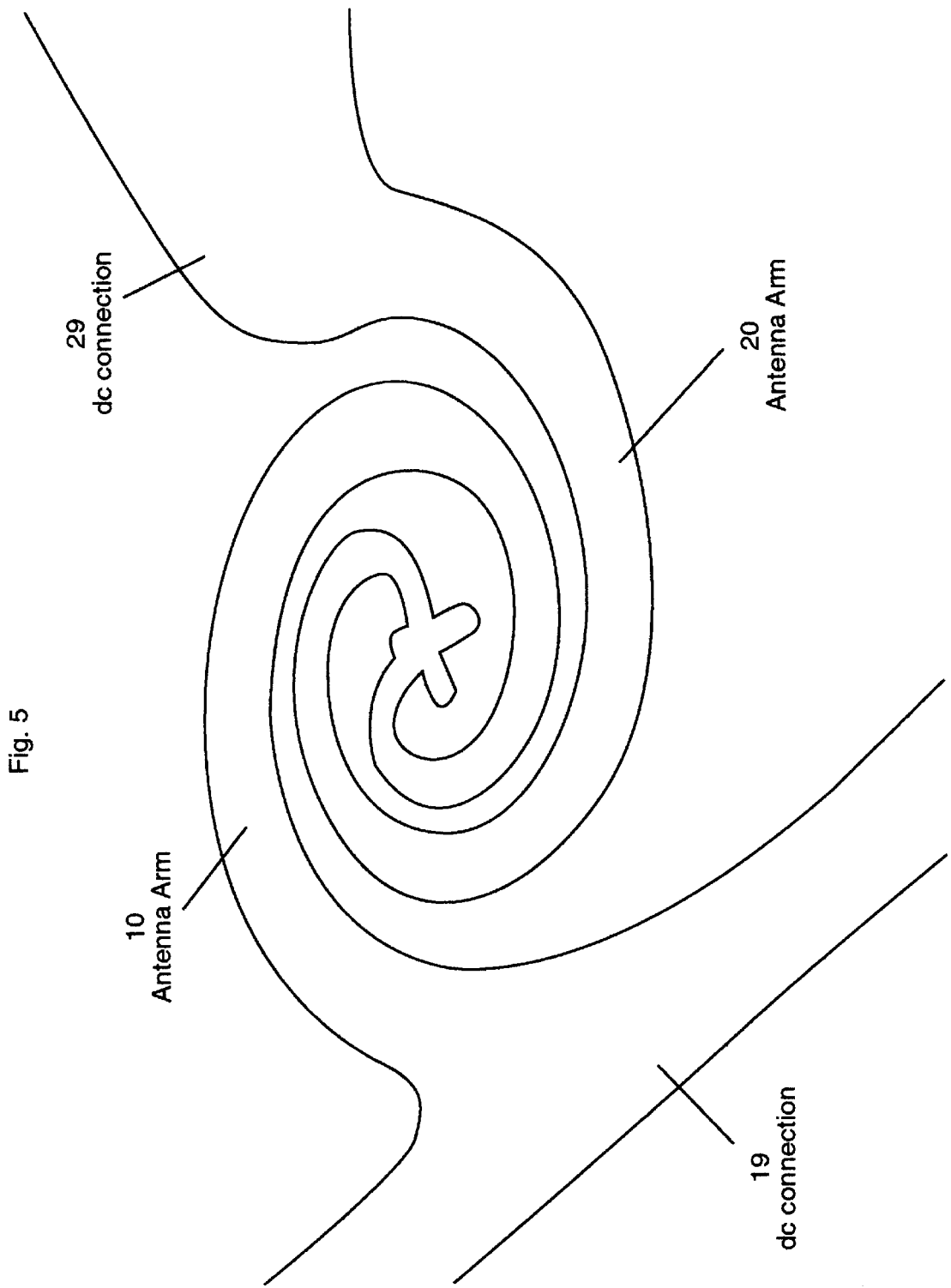
FIG. 5 is an enlarged view of an actual embodiment of the subject invention.

The polarization tuning is demonstrated herein on an individual antenna-coupled infrared sensor of the type described in *Applied Optics* Vol. 36, pp 6458–6490, (Sep. 1, 1997). FIG. 5 is an enlarged magnified view of the antenna 1, wherein approximately one inch pictured is equivalent to approximately 1/30,000 of the an inch. The antenna 1 used for this demonstration was Nickel on Silicon in a spiral configuration, with the arms 10, 20 closest to the contact region intersecting at a 90 degree angle, as seen in FIG. 1A. Elements 10, 19, 20 and 29 correspond to like components described in reference to FIGS. 1A–1B. The sensor 15 (shown more clearly in FIG. 1B) was a metal-metaloxide-metal (MOM) diode, of the type described in "Nanometer thin-film Ni—NiO—Ni diodes for 30 THz radiation", *Applied Physics*, Vol. A 58, p. 329–342, 1994. The capacitance of the contact area (of dimensions approximately 0.25 micrometer on a side) is on the order of 0.1 nanofarads. It is estimated that a change in bias voltage from approximately −160 millivolts to +160 millivolts changes the capacitance of the sensor(contact A) 15 by at least a factor of two.

Figure 6:
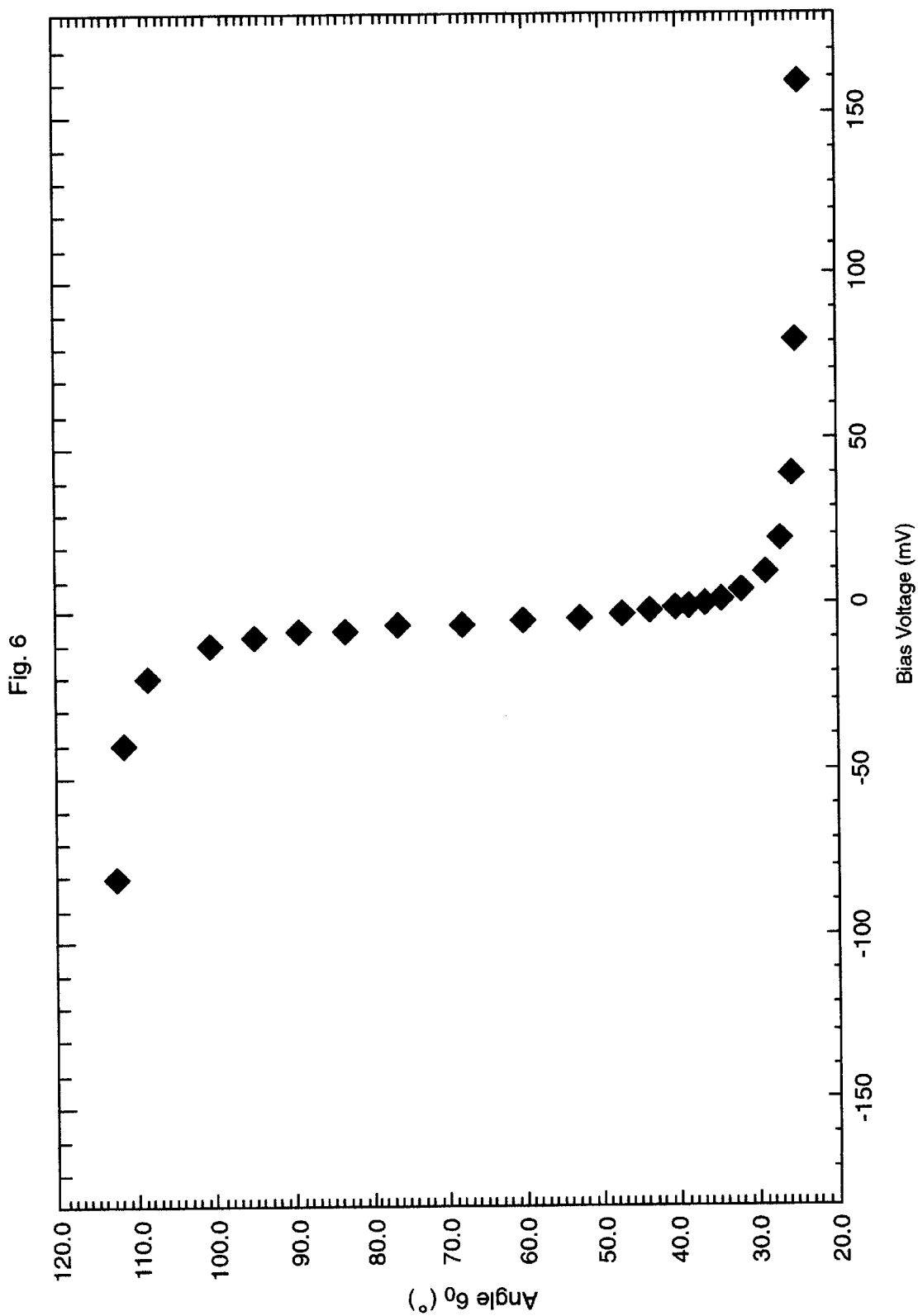
FIG. 6 is a measured plot of the demonstrated tuning of polarization angle as a function of applied bias voltage.

The polarization angle was measured using a procedure similar to that described in *Applied Optics* Vol. 36, pp 6485–6490, 1997. When the bias voltage was varied between approximately −160 millivolts to approximately +160 millivolts, the polarization angle of the detector 1 tuned continuously and repeatably from 113 degrees to 25 degrees, demonstrating a total tuning range of approximately 88 degrees. This measured polarization tuning data is shown in FIG. 6, which shows that a range of polarization tuning is possible that is sufficient to encompass both vertical and horizontal polarization. This flexibility allows for radiation reception in an selected polarization state.

The invention facilitates the development of compact, no-moving parts, imaging polarimeters. Having the polarization tuning mechanism integrated directly onto a chip will eliminate a large portion of the optical systems that are otherwise required for polarization resolved imaging.

Furthermore, the subject invention allows passive infrared sensors to have improved feature extraction, discrimination and clutter removal. The tuning accomplished by the invention is substantially faster using electrically controlled antennae than using bulk optics. One-frame-at-a time tuning allows for faster algorithms to be implemented giving more complex capabilities in real-time, such as differentiation of man-made targets from foliage.

Figure 7:
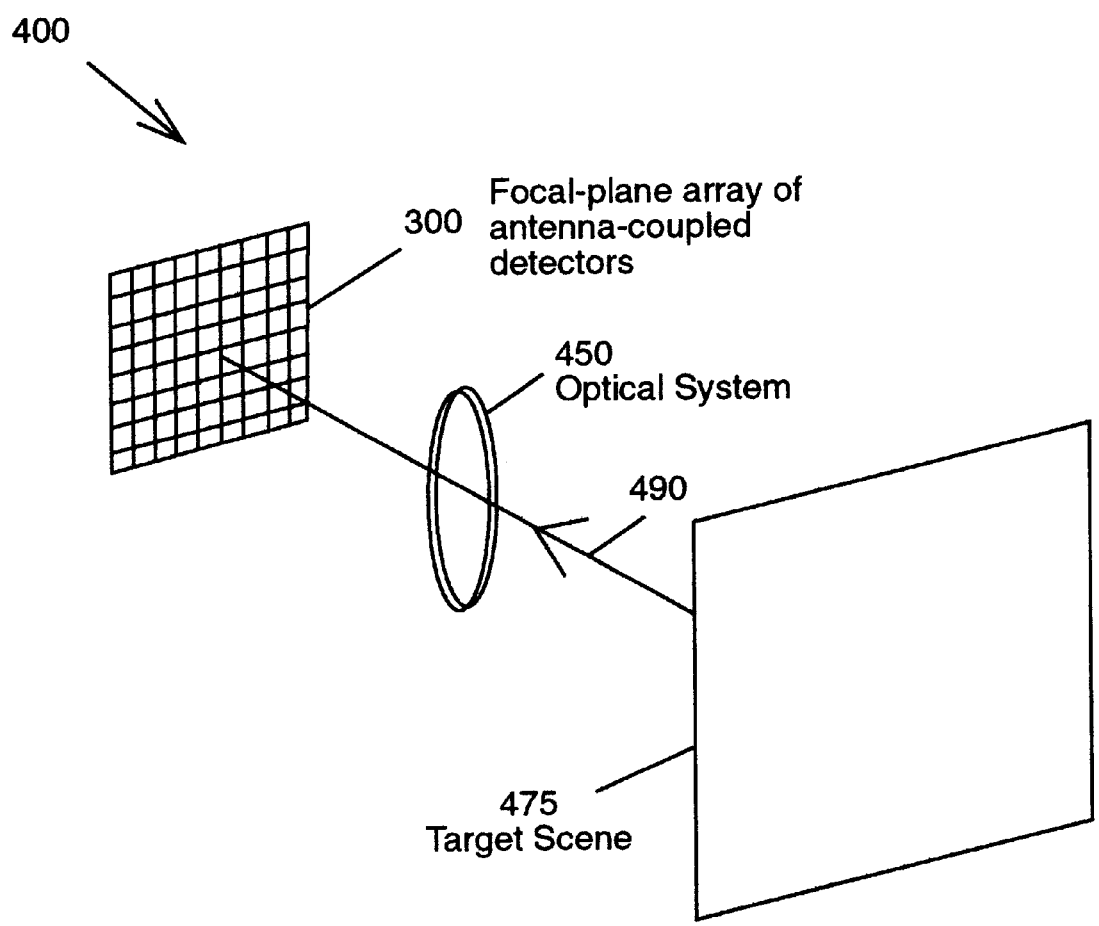
FIG. 7 shows a typical application of the subject invention.

FIG. 7 shows a typical application 400 of the subject invention where the focal-plane array of antenna-coupled detectors 300 (FIG. 4) receives radiation 490 from the field of view of a target scene 475 such as an earth surface, weaponry and the like, with a typical optical system 450 such as but not limited to an infra-red(IR) transmitting lens such as silicon and zinc selenoid. Such an application 400 can be used for remote sensing such as earth resource mapping, pollution monitoring, surveillance and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An infrared (IR) detector antenna unit for detecting IR radiation that is compact with no-moving parts, comprising:

an infrared (IR) sensor for receiving incident electromagnetic radiation;

first and second antenna arms coupled to and extending from the sensor whereby electromagnetic radiation incident on said sensor induces infrared-frequency current waves to flow in said arms; and, means for applying a bias source to the sensor for polarization tuning, wherein the IR detector antenna unit has enhanced feature extraction, discrimination and clutter removal.

2. The IR detector antenna unit of claim 1, wherein the unit includes:

a cell configuration having sides of approximately 40 to approximately 50 microns.

3. The IR detector antenna unit of claim 1, further comprising:

plural cells arranged in an antenna-coupled focal plane array(FPA).

4. The IR detector antenna unit of claim 3, wherein the array includes:

dimensions of approximately 5 mm to approximately 25 mm on each side.

5. The IR detector antenna unit of claim 1, wherein the polarization tuning means include:

diode.

6. The IR detector antenna unit of claim 1, wherein the polarization tuning means include:

voltage-controlled capacitors.

7. The IR detector antenna of claim 1, wherein the infrared(IR) sensor is chosen from one of:

tunnel diodes, Schottky diodes, photovoltaics, photoconductors and pyroelectrics.

8. The IR detector antenna unit of claim 1, wherein each of the antenna arms is formed from at least one metal chosen from:

nickel, aluminum, gold and an equivalent metal.

9. The IR detector antenna unit of claim 1, wherein the antenna arms and the polarization tuning devices are formed by:

electron-beam lithography.

10. The IR detector antenna unit of claim 1, wherein each of the antenna arms include:

longitudinal members extending out from the infrared sensor.

11. The IR detector antenna unit of claim 1, wherein the first and the second antenna arms are:

oriented and connected perpendicular to one another.

12. The IR detector antenna unit of claim 11, further comprising:

a second set of perpendicular oriented antenna arms, the second set oriented and connected perpendicular to the first and the second antenna arms.

13. The IR detector antenna unit of claim 1, wherein the first and the second antenna arms further include:

a spiral pattern.

14. The IR detector unit of claim 1, wherein the bias source includes:

approximately −160 millivolts to approximately +160 millivolts.

15. The IR detector antenna unit of claim 1, wherein a polarization angle of the unit is:

tuned between approximately 113 degrees to approximately 25 degrees.

16. The IR detector antenna unit of claim 1, further including:

a total tuning range of approximately 88 degrees.

17. An Infrared (IR) detector antenna unit for detecting IR radiation comprising:

an infrared(IR) sensor for receiving IR radiation;

longitudinal metal antenna arms extending outward from the sensor and coupled directly thereto;

means for applying a bias source to the sensor for polarization tuning; and wherein the polarization tuning means enable real-time control of current distribution in the antenna arms.

18. The Infrared IR detector antenna unit of claim 17, wherein the infrared(IR) sensor is chosen from one of:

tunnel diodes, schottky diodes, photovoltaics, photoconductors, and pyroelectrics.

19. The Infrared IR detector antenna unit of claim 17, wherein the antenna arms further include:

a spiral pattern.

* * * * *

UNITED STATES PATENT AND TRADEMARK OFFICE
Certificate

Patent No. 6,037,590　　　　　　　　　　　　　　　　　Patented: March 14, 2000

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Glenn D. Boreman, Aristide Doguariu, Christos Christodoulou and Christophe O. Fumeaux.

Signed and Sealed this Eighth Day of August, 2000.

SEUNGSOOK HAM
*Supervisory Patent Examiner*
Group Art Unit 2878

UNITED STATES PATENT AND TRADEMARK OFFICE
CERTIFICATE OF CORRECTION

PATENT NO. : 6,037,590
DATED : Mar. 14, 2000
INVENTOR(S) : Boreman et al.

It is certified that error appears in the above-identified patent and that said Letters Patent is hereby corrected as shown below:

Title page,
Item [60], Related U.S. Application Data, should be changed to read:

-- This invention claims priority of U.S. Provisional Application No. 60/048,334 entitled: Tunable Antenna-Coupled Infrared Detector, filed on May 30, 1997, and this invention was made with Government support under N66001-98-D-6003 awarded by Space and Naval Warfare Systems Center, San Diego. The Government has certain rights in this invention. --

Signed and Sealed this

Fifth Day of October, 2004

JON W. DUDAS
*Director of the United States Patent and Trademark Office*